J. DE BRETON, Sr.
Making Sugar.
No. 4,059.
Patented May 24, 1845.
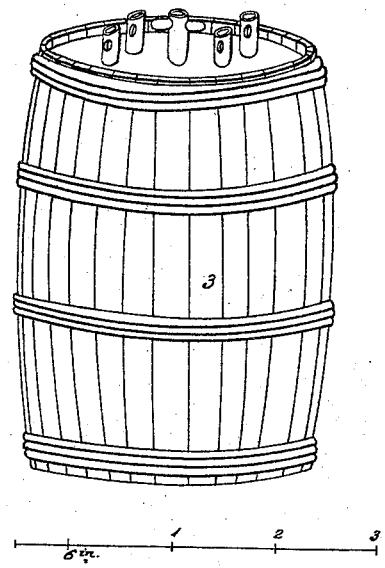
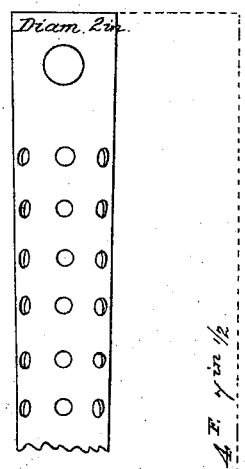
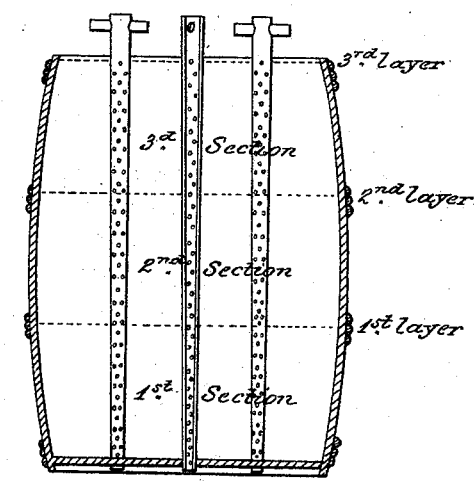
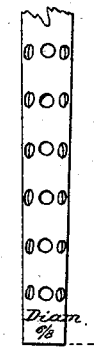

UNITED STATES PATENT OFFICE.

JOHN DE BRETTON, SR., OF NEW ORLEANS, LOUISIANA.

IMPROVEMENT IN MAKING SUGAR.

Specification forming part of Letters Patent No. 4,059, dated May 24, 1845.

*To all whom it may concern:*

Be it known that I, J. DE BRETTON, Sr., of New Orleans, Louisiana, have invented a new and Improved Method of Clarifying, Graining, and Draining Sugar; and I do hereby declare that the following is a full, clear, and exact description thereof, reference being had to the drawings herewith accompanying, in which—

Figure 1 represents the draining-hogshead; Fig. 2, the section of the same; Fig. 3, one of the copper tubes detached. A drawing of the common parts of a sugar apparatus are not deemed necessary, and are therefore omitted.

In manufacturing sugar by my improved process the cane-juice from the mill is passed through a wire sifter into the clarifying-pan, all of the usual construction. When in the clarifier, a small quantity of the prepared lime or fining must be given and heat applied, in order to facilitate the heavy skimming to float on top. The liquor is then drawn into the precipitator, where it receives its full quantity of its preparation of fining. From the precipitator or precipitators the liquor is then drawn into the kettle and goes through the same process of boiling as in the ordinary way. When the liquor comes to the battery-kettle, four or five minutes before striking, add four ounces of burnt alum and one ounce of dragon's-blood, combined with twelve grains of arsenic.

The fining-paste or prepared lime is made of about sixteen ounces of sulphate of zinc dissolved in about three gallons of boiling-hot river or rain water, throwing in fine sifted quicklime, and stirring it well up until it becomes a paste. The quantity of this paste—say two to four pounds are used for every turn of about four hundred gallons of juice—is mixed with five or six pounds of fine pulverized chalk or whiting dissolved with about five gallons of hot juice from the precipitator, which is then thrown in the precipitator, where it is well stirred up, after to remain from twenty to thirty minutes to precipitate all the filth or dregs. The quantity of prepared lime to be given varies according to the nature of the juice, and can only be given according to the judgment of a skillful sugar-maker.

When the sugar is fit to be potted, five copper pipes or tubes, *a*, Fig. 3, perforated with small holes an inch apart, are placed perpendicularly in the hogsheads. (See Figs. 1 and 2.) The tubes are made in a conical form, hollow inside. The diameter on top is to be two inches, tapering down to three-quarters of an inch diameter at the end. The hogshead is then filled about one-third full of sugar; or, if ten hogsheads are to be potted, you will fill them all, as said above, one-third full. Then commence throwing on each with a watering-pot one-half gallon of strong rum, which it called a "wash," and is for the purpose of dissolving and carrying off the molasses. Then put on another layer of sugar on the first hogshead, and so on in rotation, as mentioned in the first instance, and again wash with half a gallon more of rum, after which the last third of the sugar is potted in each and every one of the hogsheads, and the same quantity of rum is applied, so that each hogshead receives one and a half gallon of rum when entirely filled. The pipes placed in the hogshead are to be turned frequently round after they have been in twelve hours. In the said pipes an iron or wooden rod small enough to go through them is used for the purpose of clearing away any obstruction that may be caused by the rapid flowing of the molasses, which ought to be done three or four times in the first twenty-four hours. After forty-eight hours have elapsed the pipes are removed to be used in other hogsheads, and are replaced by wooden sticks large enough to fill the space made by the pipes that are introduced into the vacant holes in the sugar. These are kept there until the sugar in the hogshead is found to be sufficiently drained. They are taken away; but care must be taken to have these curing-holes kept open to admit of the molasses draining as much as possible until the sugar is fit for market.

Having thus fully described my improvement, what I claim therein as my invention, for which I desire to secure Letters Patent, is—

1. The method of using the rum, as above specified, in potting sugar—that is to say, by wetting each layer with the rum as it is potted.

2. The conical perforated tubes inserted into the hogshead through which the molasses runs, which can be cleared by a stick or otherwise on the inside.

In witness whereof I hereunto subscribe my hand before the witnesses under named.

J. DE BRETEON, SENIOR.

Witnesses:
F. M. GUYOLA,
A. L. MUHL.